US 9,143,416 B2
Sep. 22, 2015

(12) United States Patent
Myrah et al.

(10) Patent No.: US 9,143,416 B2
(45) Date of Patent: Sep. 22, 2015

(54) EXPANDER DEVICE

(75) Inventors: Michael G. Myrah, Cypress, TX (US); Jose Dirceu Grundler Ramos, Porto Alegre Rio Grande do Sul (BR); Daniel Minto Ilha, Porto Alegre Rio Grande do Sul (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 258 days.

(21) Appl. No.: 13/527,237

(22) Filed: Jun. 19, 2012

(65) Prior Publication Data
US 2013/0336105 A1 Dec. 19, 2013

(51) Int. Cl.
H04L 1/00 (2006.01)
H04L 12/26 (2006.01)
H04L 12/24 (2006.01)

(52) U.S. Cl.
CPC ........ H04L 43/0817 (2013.01); H04L 41/0672 (2013.01)

(58) Field of Classification Search
USPC .................................................. 370/216–220
See application file for complete search history.

(56) References Cited

U.S. PATENT DOCUMENTS

| | | | | |
|---|---|---|---|---|
| 6,070,207 A * | 5/2000 | Bell | ............................. | 710/302 |
| 7,401,171 B2 * | 7/2008 | Slutz et al. | .................... | 710/104 |
| 7,738,366 B2 | 6/2010 | Uddenberg et al. | | |
| 7,882,281 B2 | 2/2011 | Jones et al. | | |
| 2003/0131066 A1 * | 7/2003 | Frick | ............................. | 709/212 |
| 2005/0125574 A1 * | 6/2005 | Foster et al. | ..................... | 710/36 |
| 2008/0005470 A1 * | 1/2008 | Davies | ......................... | 711/114 |
| 2008/0010530 A1 | 1/2008 | Davies et al. | | |
| 2009/0007154 A1 * | 1/2009 | Jones | ............................ | 719/326 |
| 2009/0172706 A1 * | 7/2009 | Jones | ............................ | 719/326 |
| 2011/0246685 A1 * | 10/2011 | Hu | .................................. | 710/18 |
| 2011/0320706 A1 * | 12/2011 | Nakajima | ..................... | 711/114 |
| 2012/0239843 A1 * | 9/2012 | Khanvilkar et al. | .......... | 710/300 |
| 2013/0080829 A1 * | 3/2013 | Colline | ........................ | 714/6.22 |

OTHER PUBLICATIONS

American National Standard for Information Technology. SAS Protocol Layer (SPL). Reference No. ISO/IEC 14776-261:201X. Jul. 20, 2010. Chapter 4, pp. 32-127.
PMC-Sierra In. SW/FW User Manual Preliminary. Mar. 2012, pp. 1-150 (Parts 1-3 file upload).
Oracle's Sun Fire X4170 M2 and Sun Fire X4270 M2 Server Architecture; Oracle White Paper; Jan. 1, 2011.
PMC-Sierra Inc. PM73206_04 SXP12G Dev 04.02 SW/FW User Manual Preliminary Issue No. 1: Mar. 2012. pp. 1-19 and 345-349.
American National Standard for Information Technology. SAS Protocol Layer. pp. 1-127.

* cited by examiner

Primary Examiner — Charles C Jiang
Assistant Examiner — Will Lin
(74) Attorney, Agent, or Firm — Hewlett-Packard Patent Department

(57) ABSTRACT

An example expander includes a processor, a switch, and a plurality of physical layer devices (PHYs). The processor is to detect an error condition and, in response to detecting the error condition, cause the expander to enter a reduced functionality mode which keeps the switch and the plurality of physical layer devices (PHYs) operating notwithstanding the error condition.

17 Claims, 5 Drawing Sheets

EXPANDER DEVICE

BACKGROUND

Serial attached SCSI (SAS) is generally a point-to-point architecture that transfers data to and from small computer system interface (SCSI) storage devices by using serial communication. In a SAS storage environment, there are typically three types of SAS devices: initiators, targets, and expanders. The initiator is a device that originates processing requests for a target and receives responses from the target. The initiator may be, for example, a host bus adapter (HBA) or a data storage controller. The target is device that receives processing requests from initiators and sends responses to the respective initiators. The target may be, for example, an end device such as a SAS hard disk drive, serial ATA (SATA) hard disk drive, solid state disk (SSD), or SAS tape drive. The expander is an intermediate device that forms part of the service delivery subsystem and facilitates communication between initiators, targets, and/or other expanders. In particular, the expander may facilitate the connection of multiple SAS target devices to a single initiator port, thereby creating a larger SAS domain.

BRIEF DESCRIPTION OF THE DRAWINGS

Examples are described in the following detailed description and in reference to the drawings, in which.

DETAILED DESCRIPTION

Figure 1:
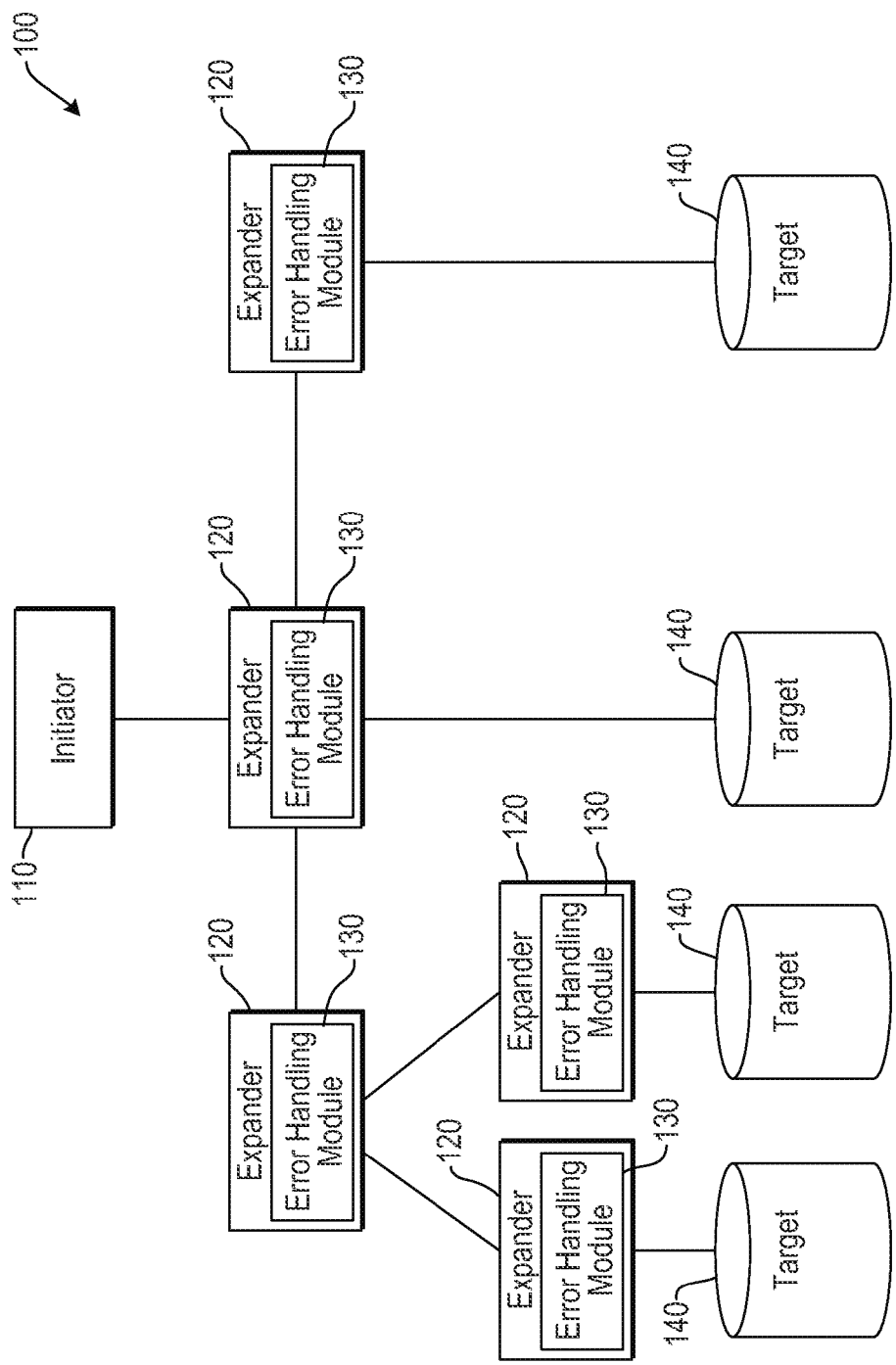
FIG. 1 depicts a block diagram of an example system in accordance with an implementation.

Various aspects of the present disclosure are directed to an enhanced expander device. More precisely, various aspects of the present disclosure are directed to an enhanced expander device that enters a reduced functionality mode in response to detecting an error condition, wherein components such as physical layer devices (PHYs) and/or switches that are associated with the expander device continue to operate even as other components associated with the expander device (e.g., a processor) are reset.

In current systems, when an expander device detects an error condition (e.g., a memory bus read failure, illegal memory access exception, stack overflow, and/or invalid operation), the expander device resets. More specifically, the PHYs, switch, processor, and potentially other components associated with the expander reset. This reset event is problematic because, from the perspective of an initiator device connected to the expander device, it appears as though drives are being hot removed and hot added. This perception to the initiator commonly results in failed logical drives when a redundant SAS expander is not present (i.e., in a single domain environment).

Various aspects of the present disclosure address at least the above by providing a novel and previously unforeseen approach for expander device error handling. In particular, aspects of the present disclosure describe an expander device that detects an error condition and enters a reduced functionality mode wherein at least the PHYs continue to operate while other expander components are reset in response to the error condition. As a result, an initiator device communicating with the expander device does not erroneously detect that a drive is being hot added/removed, and therefore the amount of failed logical drives is mitigated. Moreover, in some implementations, the expander may sustain input/output (I/O) traffic through the expander while processing the error event.

In one example in accordance with the present disclosure, an expander device (e.g., a SAS expander) is provided. The expander device comprises a processor, a switch (e.g., comprising an expander connection manager (ECM) and/or expander connection router (ECR)), and a plurality of PHYs. The processor is to detect an error condition (e.g., a fatal error such as a memory bus read failure, illegal memory access exception, stack overflow, and invalid operation) and, in response to detecting the error condition, to cause the expander device to enter a reduced functionality mode which maintains the switch and the plurality of PHYs operating notwithstanding the error condition. The processor may cause the expander device to enter a reduced functionality mode by setting a reduced functionality mode flag in a processing device register. In addition, the processor may reset after causing the expander device to enter the reduced functionality mode. Furthermore, while in the reduced functionality mode, the expander device may respond with a non-abandon claim OPEN REJECT response such as an OPEN REJECT (RETRY) message in response to receiving a connection request targeted to the expander device, or route the connection request to a target device if the connection request is not targeted to the expander device.

In another example in accordance with the present disclosure, a method is provided. The method comprises conducting the following processes by an expander device: detecting that an error condition has occurred, setting a reduced functionality mode flag in response to detecting the error condition, and entering a reduced functionality mode, wherein PHYs associated with the expander device continue to operate during the reduced functionality mode even as at least one other component of the expander device is reset. The method may further comprise transmitting an OPEN REJECT (RETRY) message in response to determining that a received connection request is targeted to the expander device while the expander device is in reduced functionality mode, or transmitting a connection request to a target device in response to determining that a received connection request is not targeted to the expander device while the expander device is in reduced functionality mode.

In still another example in accordance with the present disclosure, a non-transitory machine-readable medium is provided. The machine-readable medium comprises instructions which, when executed, cause an expander to detect an error condition and enter a reduced functionality mode in response to detecting the error condition, wherein physical layer devices (PHYs) and an expander connection manager (ECM) associated with the expander continue to operate during the reduced functionality mode even as at least one other component (e.g., the processor) of the expander is reset.

FIG. 1 depicts an example system 100 in accordance with an implementation. The system comprises an initiator 110, a plurality of expanders 120, and a plurality of targets 140. It should be readily apparent that the system 100 is a generalized illustration and that other elements may be added or existing elements may be removed, modified, or rearranged without departing from the scope of the present disclosure.

For example, while the system 100 depicted in FIG. 1 includes only four targets 140, the system may actually comprise more or less targets or other components.

The initiator 110 may be, for example, a host bus adapter (HBA) or a data storage controller. The initiator 110 may have multiple ports for connection to internal and/or external targets. Each initiator port may have a single physical link (e.g., a narrow port) or two, four, or eight physical links (e.g., a wide port). In a SAS domain, the initiator 110 may comprise Serial SCSI Protocol (SSP), Serial ATA Tunneling Protocol (STP), and/or Serial Management Protocol (SMP) initiator ports. The initiator 110 may generally function to originate processing requests for a target and/or to receive responses from the target. More specifically, the initiator 110 may originate device-service and task-management requests for processing by a target 140, and receive responses for the same requests from the target 140. Depending on the implementation, the initiator 110 may be connected directly to a target or indirectly via an expander 120. Such connection may be made via, e.g., physical links consisting of two wire pairs connecting the transmitter of a PHY in one device (e.g., the initiator) to the receiver of a PHY in another device (e.g., an expander).

The target 140 may be, for example, an end device such as a SAS hard disk drive, serial ATA (SATA) hard disk drive, solid state disk (SSD), or SAS tape drive. The target 140 may include logical units and target ports that receive device service and task management requests for processing and send responses for the same to initiators 110. As mentioned, depending on the implementation, the target 140 may be connected directly to an initiator 110 target or indirectly via an expander 120.

The expander 120 may be, for example, a SAS expander and/or be part of an input/output (I/O) module. The expander 120 may form part of the service delivery subsystem and facilitate communication between the initiator 110, targets 140, and/or other expanders 120. More particularly, the expander 120 may establish connections between initiators 110, targets 140, and/or other expanders 120 by receiving commands and data in one port and routing them to another port based on the address (e.g., SAS address) of the target. The expander 120 may use direct, table, and/or subtractive routing processes. The direct routing may be used to forward commands and data to targets directly attached to the expander 120. The table routing may be used to forward commands and data to another expander 120. The subtractive routing may be used to forward commands and data that the expander does not recognize to another expander 120 that does recognize the information.

The expander 120 may include an error handling module 130. Depending on the implementation, the error handling module 130 may be implemented in hardware, software, or a combination of both. For example, the error handling module 130 may correspond to an application-specific integrated circuit (ASIC), a logic device, and/or a processor in communication with an integrated or discrete memory having instructions stored thereon. In some implementations, the expander 120 is in communication with a flash memory that stores instructions that are loaded onto RAM of the expander and executed by a processor of the expander to cause functions described herein. In other implementations, the expander 120 includes instructions stored thereon that, when executed by the processor, cause functions described herein. Such instructions may comprise exception handling instructions for the expander 120, for example.

The error handling module 130 may be configured to handle error situations that occur with respect to the expander 120. More precisely, the error handling module 130 may detect an error event. The error event may be, for example, a fatal system error that causes a crash dump such as a bus read failure, illegal memory access exception, stack overflow, invalid operation (e.g., division by zero), or the like. In response to detecting such an error event, the error handling module 130 may cause the expander 120 to enter a reduced functionality mode which keeps the switch (e.g., an expander connection manager) and a plurality of PHYs operating notwithstanding the error condition. Stated differently, in response to detecting such an error event, the error handling module 130 may enter a reduced functionality mode in response to detecting an error condition, wherein the PHYs and an expander connection manager associated with the expander 120 continue to operate during the reduced functionality mode even as other components of the expander 120 are reset. Hence, the expander 120 may sustain I/O traffic through the expander while processing the error event, and as a result the amount of failed logical drives due to the error event may be mitigated.

Figure 2:
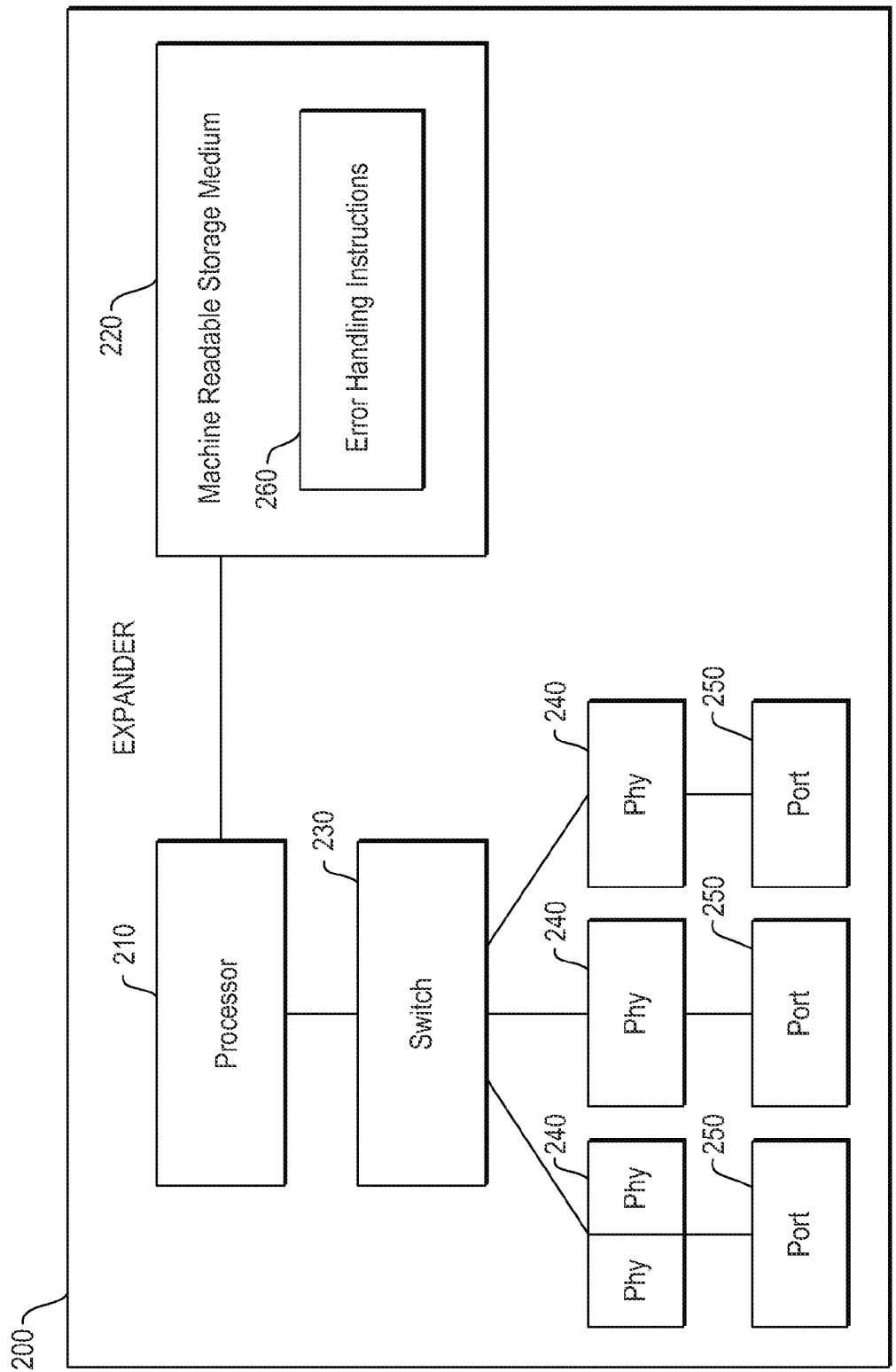
FIG. 2 depicts a block diagram of an example expander device in accordance with an implementation.

FIG. 2 depicts an example expander 200 in accordance with an implementation. The expander 200 comprises a processor 210, a machine-readable storage medium 220, a switch 230, a plurality of PHYs 240, and a plurality of ports 250. It should be readily apparent that the depicted expander 200 is merely an example and that other elements may be added or existing elements may be removed, modified, or rearranged without departing from the scope of the present disclosure. For example, while the expander 200 depicted in FIG. 2 includes only three PHYs 240 and ports 250, the expander 200 may actually comprise many more PHYs 240 and ports 250. Furthermore, while the machine readable storage medium 260 with error handling instructions 260 is shown as being within the expander 200, in some implementations, the readable storage medium 260 with error handling instructions 260 may be separate from the expander 200 and accessible via a bus or communication path. Still further, in some implementation, the error handling instructions 260 may be distributed across integrated and/or discrete machine readable mediums with respect to the expander.

As used herein, a "processor" may be at least one of a central processing unit (CPU), an ASIC processor, a semi-conductor-based microprocessor, a field-programmable gate array (FPGA) configured to retrieve and execute instructions, other electronic circuitry suitable for the retrieval and execution of instructions stored on a machine-readable storage medium, or a combination thereof. The processor 210 may fetch, decode, and execute instructions stored on the storage medium 220 to implement the functionalities described below. In other examples, the functionalities of any of the instructions of the storage medium 220 may be implemented in the form of electronic circuitry, in the form of executable instructions encoded on a machine-readable storage medium, or a combination thereof.

As used herein, a "machine-readable storage medium" may be any electronic, magnetic, optical, or other physical storage device to comprise or store information such as executable instructions, software, firmware, data, and the like. For example, any machine-readable storage medium 220 described herein may be any of Read Only Memory (ROM), Random Access Memory (RAM), flash memory, a storage drive (e.g., a hard disk), a Compact Disc Read Only Memory (CD-ROM), and the like, or a combination thereof. Further, any machine-readable storage medium 220 described herein may be non-transitory.

As used herein, a "switch" may be understood as a device that generally conducts routing functions within the expander 200 and comprises at least one of an expander connection manager (ECM) and an expander connection router (ECR), wherein the ECM may decode request packages and find destinations via a routing table and the ECR may execute the routing through, e.g., a crossbar switch. The switch 230 may conduct functions such as mapping destination addresses to link addresses using direct, subtractive, or table routed addressing processes. Moreover, the switch 230 may arbitrate and assign or deny path resources for expander link connection requests. Still further, the switch 230 may route signals.

As used herein, a "PHY" may be understood as a device that implements transmit and/or receive functions and operates at the physical layer of the OSI network model. The PHY 240 may comprise appropriate code, circuitry, and/or software/firmware to facilitate transmission and/or reception. The PHY may be referred to as a PHY transmitter, PHY receiver, PHY transceiver, PHYceiver, or PHY. The PHY 240 may be configured to conduct operations including, but not limited to, data transfer and packetization.

As used herein, a "port" may be understood as a device that receives data over a communication medium from an initiator/target and provides the data to at least one associated PHY 240 and/or receives data from at least one PHY 240 and transmits the data over a communication medium to an initiator/target. In some implementations, the port 250 may be a physical port configured to couple with a wired input and/or external to the expander 200. In some implementations, the port is a wide port with at least two PHYs associated with the port, as opposed to a narrow port that is associated with one PHY.

The machine-readable storage medium 220 may comprise error handling instructions 260. Such error handling instructions 260 may be part of an exception handler or associated with an exception handler in some implementations. The error handling instructions 260, when executed, may cause the processor 210 to detect an error event such as a bus read failure, illegal memory access exception, stack overflow, invalid operation (e.g., division by zero), or the like. In response to detecting this event, the processor 210 may cause the expander 200 to enter a reduced functionality mode by, e.g., setting a reduced functionality mode flag in a register associated with the processor 210. While in the reduced functionality mode, the plurality of PHYs 240 and switch 230 may continue to operate while other expander components such as the processor, registers, interrupt vectors, and the like are reset. Because the PHYs 240 and switch 230 continue to operate, the expander 200 may respond to connection requests without giving the perception that drives are being hot added/removed. In particular, while in the reduced functionality mode, the expander 200 may at least (i) route a connection request to a target device in response to receiving a connection request that is not targeted to the expander 200, (ii) respond with an OPEN REJECT (RETRY) message in response to receiving a connection request targeted to the expander 200, and/or (iii) respond with an OPEN REJECT (RETRY) message in response to receiving any connection request. Such action may continue, for example, until corrective action has been taken with respect to the error event (e.g., the processor 210 fully resets). Thereafter, the processor 210 may reset the reduced functionality mode flag and/or transmit a BROADCAST (Change) primitive to all initiators indicating that the expander 200 has exited reduced functionality mode and is fully functional.

Figure 3:
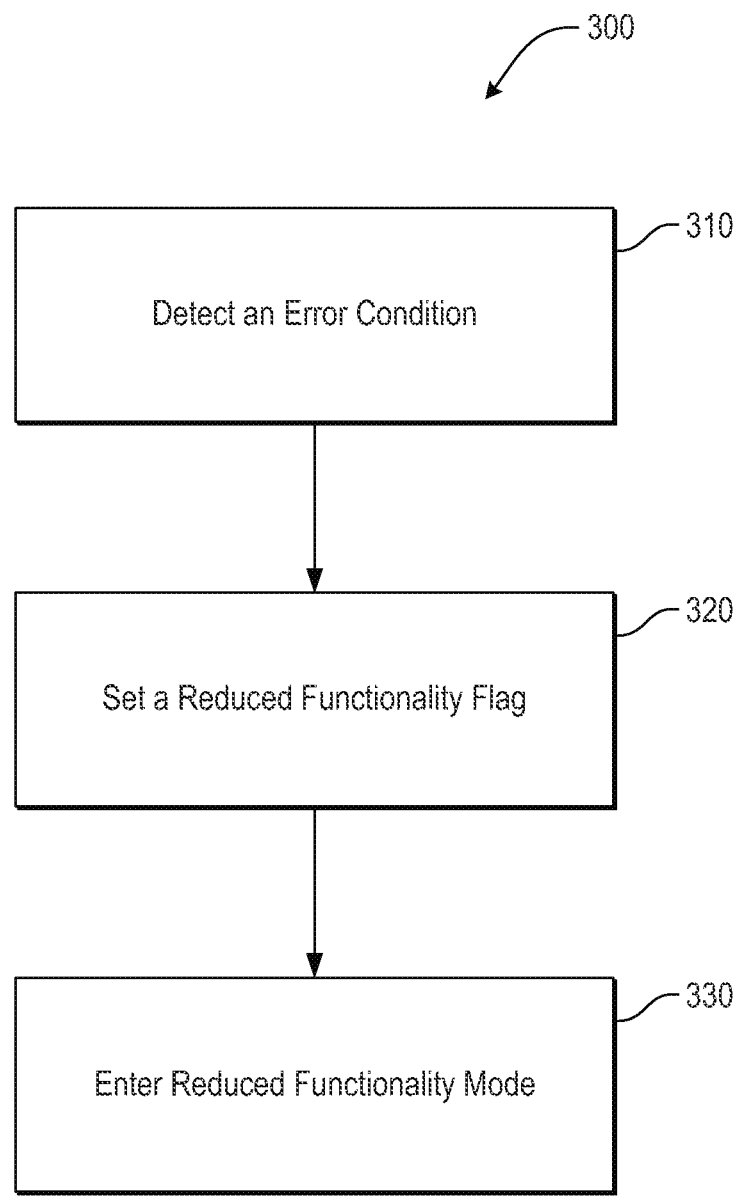
FIG. 3 depicts a flow chart of an example method for error handling in accordance with an implementation.
Figure 4:
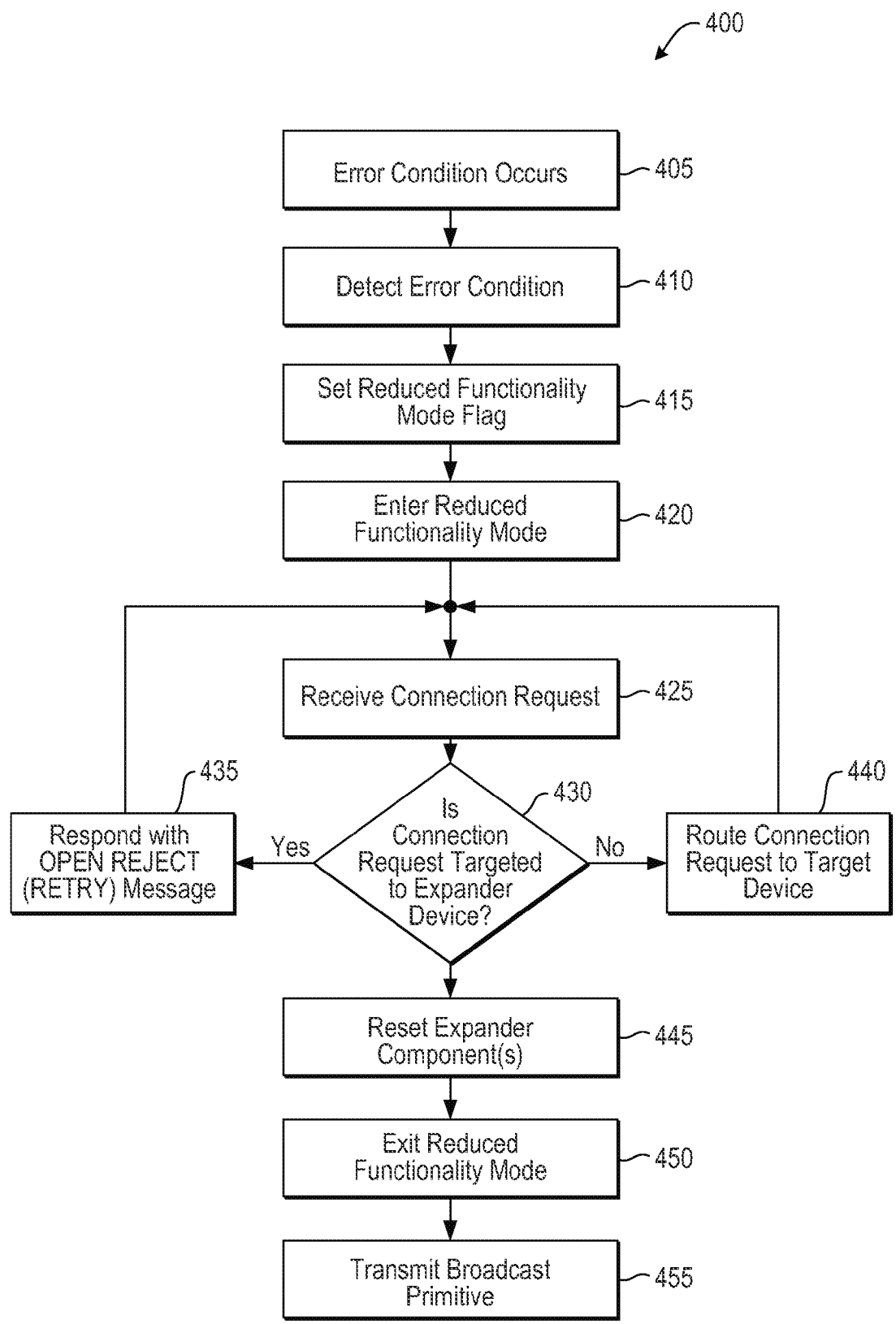
FIG. 4 depicts a flow chart of an example method for error handling in accordance with another implementation.

FIG. 3 depicts a flow chart of an example method for error handling in accordance with an implementation. It should be readily apparent that the processes depicted in FIGS. 3 and 4 represent generalized illustrations, and that other processes may be added or existing processes may be removed, modified, or rearranged without departing from the scope and spirit of the present disclosure. In addition, it should be understood that the processes may represent instructions stored on machine-readable storage medium that may cause a processor to respond, to perform actions, to change states, and/or to make decisions. Alternatively, the processes may represent functions and/or actions performed by functionally equivalent circuits like an analog circuit, a digital signal processing device circuit, an application specific integrated circuit (ASIC), or other devices associated with an expander. Furthermore, FIGS. 3 and 4 are not intended to limit the implementation of the present disclosure, but rather the figure illustrates functional information that one skilled in the art could use to design/fabricate circuits, generate software, or use a combination of hardware and software to perform the illustrated processes.

The process may begin at block 310, wherein an expander detects that an error condition has occurred with respect to the expander. The error condition may be, for example, a memory bus read failure, illegal memory access exception, stack overflow, invalid operation (e.g., division by zero), a system crash, stop error, kernel error, hardware error, and/or machine check error. At block 320, in response to detecting the error condition, the expander device may set a reduced functionality mode flag. Then, at block 330, the expander device may enter a reduced functionality mode, wherein PHYs associated with the expander continue to operate during the reduced functionality mode even as at least one other component (e.g., a processor) of the expander device is reset.

FIG. 4 depicts a flow chart of another example method for error handling in accordance with another implementation. Similar to mentioned above with respect to FIG. 3, it should be understood that the processes depicted may occur in an order different than depicted, or include more or less processes than depicted. Further, it should be understood that the figure illustrates functional information that one skilled in the art could use to design/fabricate circuits, generate software, or use a combination of hardware and software to perform the illustrated processes.

The method may begin at block 405, where an error condition occurs with respect to an expander device. The error may be a processor exception such as, for example, a divide fault, non-maskable-interrupt (NMI) interrupt, overflow trap, bounds check fault, invalid opcode fault, coprocessor not available fault, double fault, coprocessor segment overrun, invalid task state segment fault, not present fault, stack fault, general protection fault, page fault, coprocessor error fault, and alignment check fault. Such errors may typically result in a crash dump or system crash.

At block 410, the error condition is detected. This detection may occur by a processor associated with the expander device. Additionally, this detection may trigger the processor to begin running exception handler instructions. Still further, the detection may occur by hardware circuits associated with a processor that transmit a fatal error interruption that triggers exception handler instructions. As discussed below, these exception handler instructions may cause the processor to set a reduced functionality flag that causes the expander to enter reduced functionality mode.

At block 415, the processor may set a reduced functionality flag. This may be accomplished by a selection switch in the processor setting a reduced functionality mode flag in a register associated with the processor. Moreover, this operation may occur as part of the exception handler instructions, as mentioned above.

Furthermore, in some implementations (not shown in FIG. 4), in addition to setting a reduced functionality flag in response to detecting an error, the processor may also set a hardware error flag which causes the expander to send BROADCAST primitives to all initiators letting each know that a hardware error may have caused the error and therefore the error occurrence may loop indefinitely. Upon receiving this BROADCAST primitive, each initiator may proceed to determine which expander is sending a non-abandon claim OPEN REJECT response such as an OPEN REJECT (RETRY) message (discussed below at block 435) and flag that expander as potentially requiring servicing and/or replacement. The processor may deduce that the above-mentioned error condition is the result of a hardware error by, for example, receiving a processor bus error indication that signifies that the hardware is defective or is becoming defective. This may the case, for example, in an older expander.

At block 420, in response to the reduced functionality flag being set, the expander may enter reduced functionality mode. During reduced functionality mode, as discussed above, the expander may conduct a partial reset wherein some components stay fully operational while other components are reset. More specifically, a switch and the PHYs associated with the expander may stay fully operational while other components such as the processor, registers, and/or interrupt vectors reset. As part of this process (or prior to or subsequent to this process), the expander may transmit a BROADCAST primitive indicating that the expander is entering reduced functionality mode.

At block 425, while in the reduced functionality mode, the expander may receive a connection request from, e.g., an initiator device. In response to receiving such a connection request, at block 430, the expander may analyze the connection request to determine if the connection request is targeted to the expander device or to another target device. In particular, this may be accomplished by comparing a stored SAS address associated with the expander and a SAS address associated with the connection request. If the connection request is targeted to the expander device, at block 435, the expander device may respond to the connection request (e.g., respond to the initiator that sent the connection request) with a non-abandon claim OPEN REJECT response such as an OPEN REJECT (RETRY) message. If the connection request is not targeted to the expander device (e.g., the connection request is targeted to a downstream device such as a SAS hard disk drive, serial ATA (SATA) hard disk drive, solid state disk (SSD), or SAS tape drive), at block 440, the expander device may proceed to route a connection request to the appropriate target device. Furthermore, while not shown in FIG. 4, the expander device may also be configured to respond to any connection request with a non-abandon claim OPEN REJECT response such as an OPEN REJECT (RETRY) message regardless of the target. In some implementations, the initiator device that receives the OPEN REJECT (RETRY) message may have logic to determine if such responses are continuously being received over a predetermined time period (e.g., 20 seconds) in response to retry attempts. In response to such an occurrence, the initiator may deduce that the type of error at the expander is not being corrected via reset (e.g., the error is due to a hardware defect) and therefore the initiator should discontinue further retry attempts and/or flag the expander as potentially needing replacement/servicing.

It should be noted that prior to, during, or after the abovementioned connection request handling processes, the processor may be dumping context details as is typically done during a crash dump. Moreover, at block 445, expander components (e.g., the processor) may be resetting. This reset process may similarly occur prior, during, or after the abovementioned connection request handling processes.

Upon completion of component reset and/or after reduced functionality mode is complete, the expander may exit the reduced functionality mode at block 450. As part of this process, the expander may reset the reduced functionality mode flag. In addition, at block 455, the expander may transmit a Broadcast primitive to at least one initiator to inform the initiator that the expander has exited reduced functionality mode and is fully operational.

Figure 5:
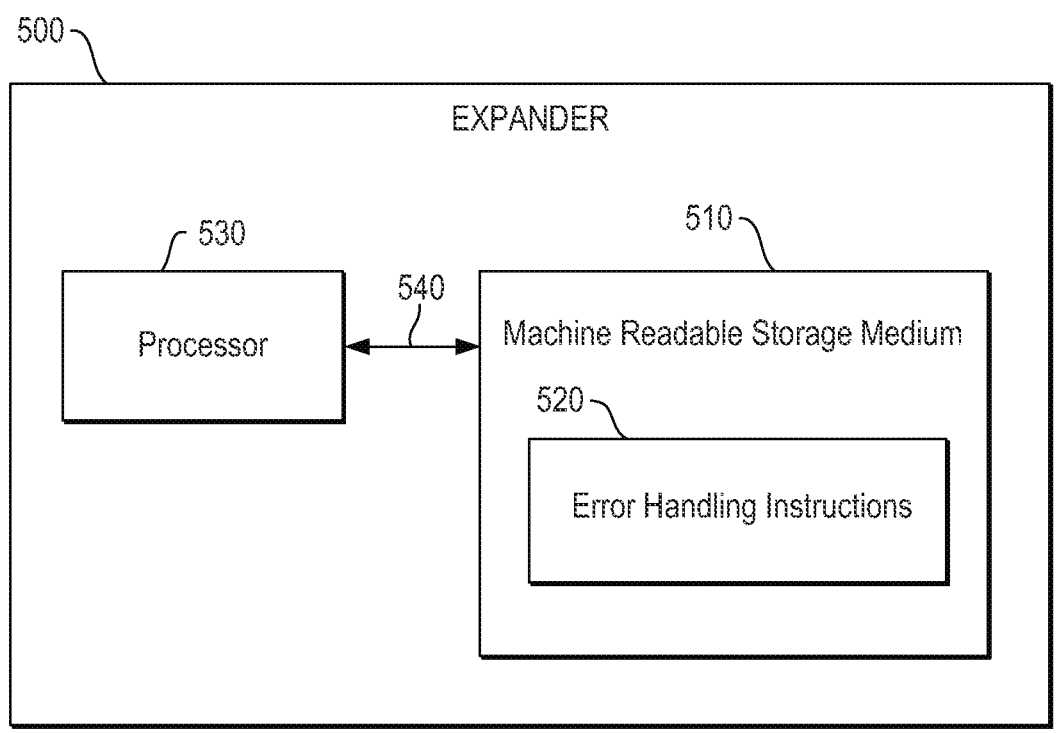
FIG. 5 depicts a block diagram of an example non-transitory machine-readable medium that stores instructions for operating an expander device in accordance with an implementation.

FIG. 5 depicts a block diagram of an example non-transitory machine-readable medium that stores instructions for operating an expander 500 in accordance with an implementation. The non-transitory machine-readable medium is generally referenced by reference number 510 and may be included within or external to the expander 500. The nontransitory machine-readable medium 510 may correspond to any typical storage device that stores machine-readable instructions, such as programming code, software, firmware, or the like. For example, the non-transitory computer-readable medium 510 may include one or more of a non-volatile memory, a volatile memory, and/or a storage device. Examples of non-volatile memory include, but are not limited to, electronically erasable programmable read only memory (EEPROM), flash memory, and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some implementations, the instructions may be part of an installation package that can be executed by the processor 530. In this case, the non-transitory machinereadable medium 510 may be a portable medium such as a CD, DVD, or flash drive or a memory maintained by a server from which the installation package can be downloaded and installed. In another implementation, the instructions may be part of an application or application already installed.

The processor 530 may generally retrieve and execute instructions stored in the machine-readable medium 510 to operate the expander 500 in accordance with the above-described examples. In one implementation, the processor 530 may access the machine-readable medium 510 via a bus 540. In some implementations, the machine-readable medium 510 may be integrated with the expander 500, while in other implementations, the machine-readable medium 510 may be a discrete component accessible by the expander 500. A region of machine-readable medium 510 may store error handling instructions which, when executed, cause the expander 500 to enter a reduced functionality mode in response to detecting a fatal error. While in this reduced functionality mode, some expander components like the PHYs and switch may continue to operate while other components such as the processor are reset.

While the above disclosure has been shown and described with reference to the foregoing examples, it should be understood that other forms, details, and implementations may be made without departing from the spirit and scope of the disclosure that is defined in the following claims.

What is claimed is:

1. An expander device comprising:
 a processor;
 a switch; and
 a plurality of physical layer devices (PHYs),
 wherein the processor is to detect an error condition with at least one component of the expander device and, in response to detecting the error condition, to cause the expander device to enter a reduced functionality mode which maintains the switch and the plurality of physical layer devices (PHYs) operating notwithstanding the error condition even as the processor of the expander device is reset to correct the error condition, wherein, while in the reduced functionality mode, the expander device is to:

receive a connection request from an initiator;

determine whether the connection request is targeted to the expander device;

in response to determining that the connection request is targeted to the expander device, respond to the connection request by sending a reject message to the initiator; and in response to determining that the connection request is not targeted to the expander device, route the connection request to a target device that is a target of the connection request.

2. The expander device of claim 1, wherein the expander device is a serial attached SCSI (SAS) expander device.

3. The expander device of claim 1, wherein the switch comprises an expander connection manager (ECM).

4. The expander device of claim 1, wherein the error condition is a fatal error.

5. The expander device of claim 1, wherein the error condition is at least one of a memory bus read failure, illegal memory access exception, stack overflow, and invalid operation.

6. The expander device of claim 1, wherein the processor is to cause the expander device to enter the reduced functionality mode by setting a reduced functionality mode flag in a processor register.

7. The expander device of claim 1, wherein the reset of the processor is to occur after causing the expander device to enter the reduced functionality mode.

8. The expander device of claim 1, wherein the reject message is a non-abandon claim OPEN REJECT response.

9. A method, comprising:

detecting, by an expander device, that an error condition has occurred;

setting, by the expander device, a reduced functionality mode flag in response to detecting the error condition;

entering, by the expander device, a reduced functionality mode, wherein physical layer devices (PHYs) associated with the expander device continue to operate during the reduced functionality mode while a processor of the expander device is reset;

receiving, by the expander device, a connection request from an initiator;

transmitting, by the expander device, a reject message to the initiator, in response to determining that the connection request is targeted to the expander device while the expander device is in the reduced functionality mode; and transmitting, by the expander device, the connection request to a target device that is a target of the connection request, in response to determining that the connection request is not targeted to the expander device while the expander device is in the reduced functionality mode.

10. The method of claim 9, further comprising:

exiting, by the expander device, the reduced functionality mode; and transmitting, by the expander device, a BROADCAST primitive to at least one initiator indicating that the expander device has exited the reduced functionality mode.

11. The method of claim 9, further comprising:

determining that the error condition is associated with a hardware error; and setting a hardware error flag that causes the expander device to transmit a BROADCAST primitive informing at least one initiator that a hardware error occurred.

12. The method of claim 9, wherein the error condition is one of a memory bus read failure, illegal memory access exception, stack overflow, and invalid operation.

13. The method of claim 9, wherein a switch of the expander device continues to operate during the reduced functionality mode.

14. A non-transitory machine-readable medium comprising instructions, which when executed, cause an expander device to:

detect an error condition with at least one component of the expander device; and enter a reduced functionality mode in response to detecting the error condition;

responsive to entering the reduced functionality mode, cause reset of a processor in the expander device, wherein physical layer devices (PHYs) and a switch in the expander device continue to operate during the reduced functionality mode while the processor in the expander device is reset; and while the expander device is in the reduced functionality mode:

receive a connection request from an initiator;

determine whether the connection request is targeted to the expander device;

in response to determining that the connection request is targeted to the expander device, respond to the connection request by sending a refect message to the initiator; and in response to determining that the connection request is not targeted to the expander device, route the connection request to a target device that is a target of the connection request, the target device separate from the expander device.

15. The non-transitory machine-readable medium of claim 14, wherein the error condition is a fatal error.

16. The non-transitory machine-readable medium of claim 14, wherein the physical layer devices (PHYs) and the switch in the expander device continue to operate during the reduced functionality mode by routing, by the expander device, at least some connection requests from initiator devices to target devices.

17. The non-transitory machine-readable medium of claim 14, wherein the instructions further cause the expander device to transmit a BROADCAST primitive to at least one initiator upon entering the reduced functionality mode, wherein the BROADCAST primitive indicates that the expander device has entered the reduced functionality mode.

* * * * *

UNITED STATES PATENT AND TRADEMARK OFFICE
CERTIFICATE OF CORRECTION

PATENT NO. : 9,143,416 B2
APPLICATION NO. : 13/527237
DATED : September 22, 2015
INVENTOR(S) : Michael G. Myrah et al.

It is certified that error appears in the above-identified patent and that said Letters Patent is hereby corrected as shown below:

In the claims,

In column 10, line 39 approx., in Claim 14, delete "refect" and insert -- reject --, therefor.

Signed and Sealed this
Tenth Day of May, 2016

Michelle K. Lee
*Director of the United States Patent and Trademark Office*